FIG. 1.

INVENTORS.
HARRY A. MEAD
LAMONT SLAGEL
ATTORNEY

INVENTORS
HARRY A. MEAD
LAMONT SLAGEL
BY
Horace B. Van Valkenburgh
ATTORNEY

INVENTORS.
HARRY A. MEAD
LAMONT SLAGEL
BY
Horace B. Van Valkenburgh
ATTORNEY

June 27, 1961 H. A. MEAD ET AL 2,990,101
BAG FOR MILK AND THE LIKE
Filed May 1, 1959 6 Sheets-Sheet 4

INVENTORS.
HARRY A. MEAD
LAMONT SLAGEL
BY
Horace B. Van Valkenburgh
ATTORNEY

H. A. MEAD ET AL 2,990,101

BAG FOR MILK AND THE LIKE

Filed May 1, 1959

INVENTORS.
HARRY A. MEAD
LAMONT SLAGEL

BY

ATTORNEY

United States Patent Office 2,990,101
Patented June 27, 1961

2,990,101
BAG FOR MILK AND THE LIKE
Harry A. Mead, Lakewood, and Lamont Slagel, Denver, Colo., assignors to Dairy Containers, Inc., Denver, Colo., a corporation of Colorado
Filed May 1, 1959, Ser. No. 810,454
10 Claims. (Cl. 229—53)

This invention relates to bags for milk and other liquids, formed of flexible or pliable, heat sealable material, particularly plastic. This application is a continuation-in-part of our copending application Serial No. 721,961, filed March 17, 1958.

Liquids such as milk have conventionally been shipped and stored in metal cans, but such cans are heavy and require reshipment from the point of use of milk to the point of filling. The point of use of the milk may be the ultimate point of use, or the point at which the milk is transferred to smaller containers, the latter for sanitary reasons. In addition, each can must be thoroughly sterilized before it is used again, sterilization being time-consuming and often inconvenient.

Among the objects of the present invention are to provide a novel bag for milk or other liquids; to provide such a bag which may be readily filled, stored and shipped; to provide such a bag which may be made in a convenient form for use; to provide such a bag which may be made of a sufficiently inexpensive material that it may be discarded after one use; to provide such a bag which may be emptied without undue difficulty; to provide such a bag which may be used for dispensing milk or other liquids; to provide such a bag which may be manufactured readily; to provide such a bag which will be efficient and effective in use; to provide a series of such bags in a form which may be readily stored and handled; to provide such a bag which may exist in a plurality of forms; and to provide such bags which may be made easily and economically.

Additional objects and the novel features of this invention will become apparent from the description which follows, taken in connection with the accompanying drawings, in which.

Figure 1:
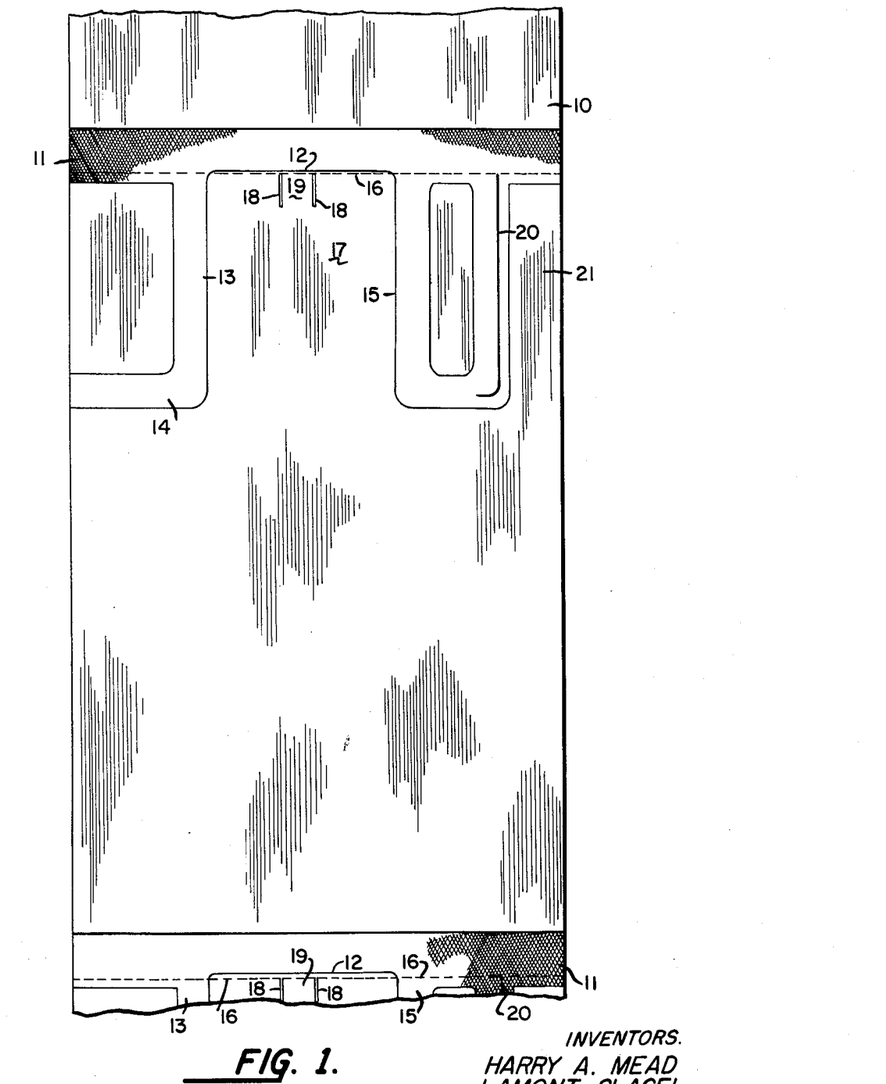
FIG. 1 is a top plan view of a portion of a flattened tubular strip, illustrating the manner in which a series of bags constructed in accordance with this invention may be produced.
Figure 2:
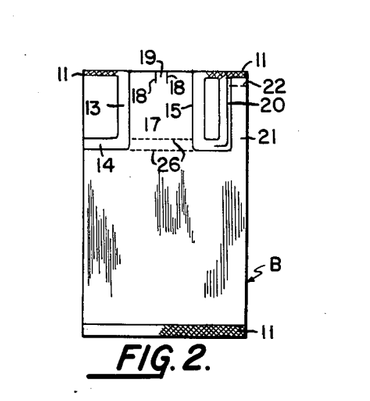
FIG. 2 is a side elevation, on a reduced scale, of a bag for milk and the like, after removal from the strip of FIG. 1.

In accordance with this invention, a series of bags for milk and the like, as in FIG. 1, may be produced from a flattened tubular strip 10 of a suitable flexible plastic, such as polyethylene, as by heat sealing and partial severing at spaced positions along the strip. The individual bags, such as the bag B of FIG. 2, remain with the strip until separated therefrom. Each heat seal, which attaches the front and rear walls of the strip together, may include a transverse section 11, slightly narrower over its center portion 12 than outwardly to the edges, with a leg section 13 extending longitudinally at a position spaced from one side of the strip and connected with a lateral section 14, which extends to the adjacent side of the strip. At a position spaced from the opposite edge of the strip, a generally U-shaped, longitudinal section 15 may extend longitudinally of the strip from the transverse section 11. A series of spaced apertures, such as cuts or perforations 16, may extend transversely along a line spaced slightly from the central portion 12 of the transverse heat sealing section 11, but across the section 11 at each side thereof, so that when a bag B of FIG. 2 is separated from the remainder of the strip along the spaced cuts or perforations 16, a major portion of the transverse heat sealing section 11 will close the bottom of the bag B, while the top of the bag will be open along a filling portion 17, i.e., between the heat sealed leg 13 and heat sealed section 15. To facilitate opening the top of the filling portion, one or more longitudinal cuts 18 may extend from the line of the spaced cuts 16, to produce tabs 19, while a longitudinal cut 20, conveniently hooking inwardly at its lower end, so as to be J-shaped, as shown, may extend from the cut line 16 within the portion of U-shaped heat seal section 15 adjacent the respective edge of the strip. As will be evident, the cut 20 will separate a portion 21 from the remainder of the top of the bag and the upper end thereof may be snipped off, as along the dash line 22 of FIG. 2, to open the upper end of the portion 21 and thereby form a pouring or discharge spout. Of course, until the top of the portion 21 is severed, it will remain sealed.

Figure 3:
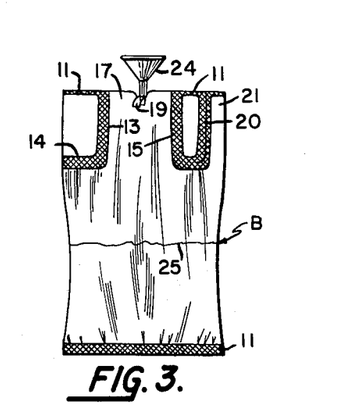
FIG. 3 is a side elevation of the bag of FIG. 2, illustrating the manner in which the bag may be filled.

The heat seals and cuts described above may be repeated at spaced intervals along the strip 10, to form individual bags when each bag, in turn, is removed from the end of the strip by tearing or cutting off along the spaced cut line 16. As will be evident, this will produce the bag B of FIG. 2. As in FIG. 3, when the bag is to be filled with a liquid, such as milk, the tabs 19 between the cuts 18 are separated and a funnel 24 or other filling device inserted in the opening in the upper end of the bag. The bag may be used for other types of liquid, it being noted that as the liquid level 25 rises, the bag will tend to assume a more nearly tubular shape, such as generally ellipsoidal in cross section, due to the restraint of the heat sealed section 11 at the bottom and the respective heat sealed sections at the top.

After the bag has been filled, such as to a position below and preferably no higher than the lower edges of the heat sealed sections 14 and 15, the filling portion 17 may be heat sealed along its lower edge, such as over the area between the dotted lines 26 of FIG. 2, but preferably is merely folded over several times and secured by a clamp or clip, such as indicated by dotted lines 27 in FIG. 4. With the filling section 17 adequately closed and the heat seal at the upper end of pouring spout 21 intact, the filled bag may be shipped or stored as desired. For emptying, the upper end of the pouring spout 21 may be cut off, as indicated previously, such as along line 2 of FIG. 2, and the contents of the bag discharged through the pouring spout 21. The bag, being formed of relatively inexpensive material, may then be discarded.

Figure 4:
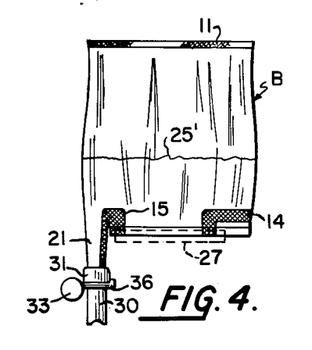
FIG. 4 is a side elevation of the filled bag, illustrating the manner in which the contents may be discharged or disposed.
Figure 5:
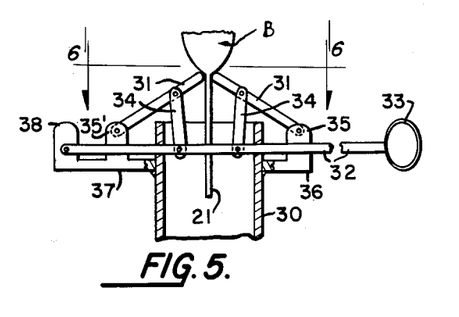
FIG. 5 is a fragmentary side elevation of a portion of FIG. 4, on an enlarged scale and partly in longitudinal section.
Figure 6:
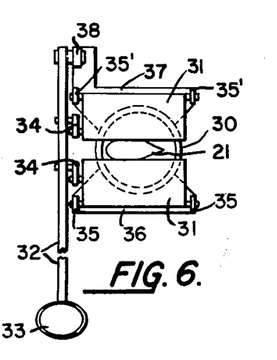
FIG. 6 is a horizontal cross section, taken along line 6—6 of FIG. 5.
Figure 7:
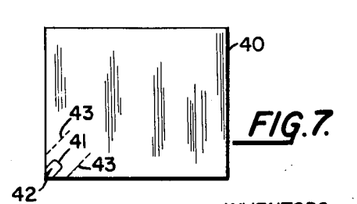
FIG. 7 is a top plan view of a carton in which the bag of this invention may be stored and shipped after filling, or used for dispensing purposes.

This bag may also be used for dispensing purposes, as in the manner illustrated in FIG. 4, by inserting the pouring spout 21 within the upper end of a discharge tube, preferably provided with a suitable valve or flow control means, such as adapted to clamp the pouring spout 21. Although any other suitable type of flow control means may be used, the flow control means may be constructed similarly to that illustrated in FIGS. 5 and 6, thereby including a pair of clamping plates 31, each having a rounded inner edge adapted to clamp the spout 21 therebetween, as in FIG. 5, to stop the flow of liquid from the bag B, and to be separated, as in FIG. 6, to permit the flow of liquid through the spout 21. Clamping plates 31 may be opened and closed by a lever 32 having an operating handle, such as a ball 33, at its outer end. Lever 32 may be connected by a link 34 with each of the clamping plates 31, each link 34 being pivotally connected at its lower end to the lever 32 and at its upper end to the respective clamping plate 31. As will be evident, with the lever in down position, as in FIG. 5, the inner ends of the clamping plates 31 will be pressed together and clamp the spout 21 therebetween, while if desired, a weight may be mounted on the lever 32 to increase the clamping effect. One of the clamping plates 31 may be pivotally mounted, adjacent its outer end, between ears 35 upstanding from a bracket 36, with the opposite plate 31 similarly pivotally mounted at its outer end between ears 35' upstanding from a bracket 37, while the inner end of lever 32 may be pivotally mounted on an ear 38, also upstanding from bracket 37. Brackets 36 and 37 may be mounted in any suitable manner on tube 30, adjacent the upper end of the latter, as being attached to a suitable clamp, or by being welded to the tube 30, as shown. The bag B may, of course, be supported in a suitable manner, as by a framework adapted to receive the bag or any other suitable support, or a carton, such as shown in FIG. 7, which may be rectangular and provided with a removable top 40 having a U-shaped slot 41 at one corner adapted to form a tab 42 which may be pushed downwardly to provide access to the underside of a portion of the top between two parallel series of spaced perforations 43, so that the tab between the perforations 43 may be lifted, thereby permitting pouring spout 21 of bag B to be pulled out through the opening thus formed. When the filled bag B is placed in the carton of FIG. 7, it is preferably disposed angularly with the pouring spout 21 in one corner. Then the top 40 of the carton is placed so that the corner having the slot 41 and perforations 43 is disposed directly above pouring spout 21. If desired, when the top is placed on the carton, tab 42 may be depressed and the end of pouring spout 21 pulled up into the slot 41, after which the tab 42 may be released to hold the pouring spout 21 so that it is readily pulled out when the tab between perforations 43 is separated from the top of the carton. As will be evident, the bags may be stored and shipped in such a carton with ease, while the bag may remain in the carton and supported by the carton when the bag is turned upside down, as for dispensing in the manner illustrated in FIG. 4 or in any other suitable manner.

Even when enclosed within a carton or other support, since the bag is flexible, it will collapse as liquid is drained therefrom, due to the pressure of atmospheric air on the bag. Thus, it is unnecessary, either for emptying or dispensing purposes, to provide a separate tube to supply air to the interior of the bag, as in the case of a can or other inflexible container, or to provide a special air hole in the container. Thus, particularly when the bag is used for dispensing purposes, the contents remain clean and sanitary, since no bacteria or other contaminants are introduced by air necessary to displace the milk discharged and to permit the remainder of the milk to flow from the container readily.

Figure 8:
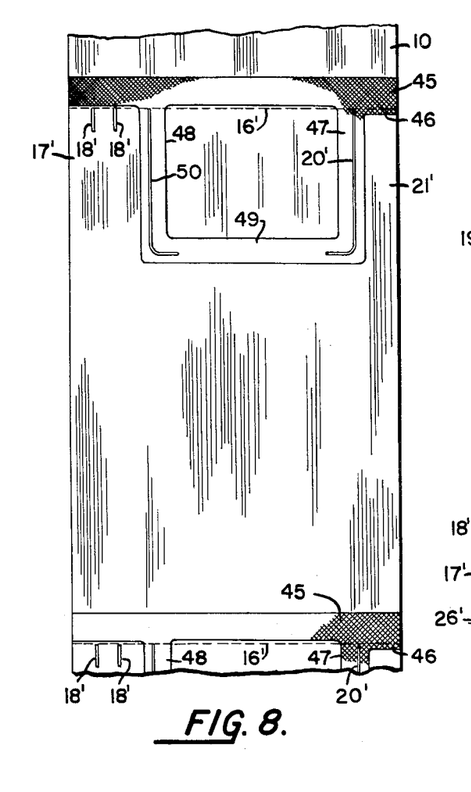
FIG. 8 is a top plan view, similar to FIG. 1 but on a reduced scale, of a portion of a flattened tubular strip, illustrating the manner in which a series of alternative bags, also constructed in accordance with this invention, may be produced.
Figure 9:
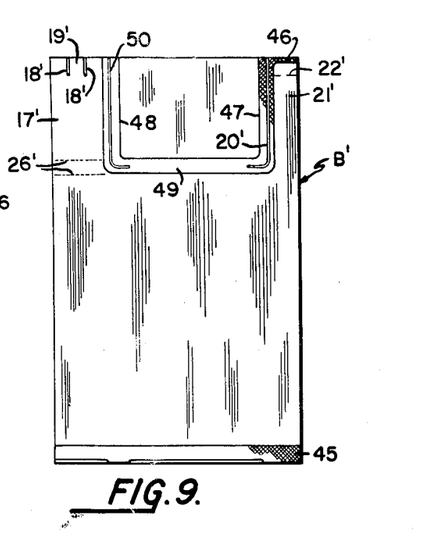
FIG. 9 is a side elevation, on a slightly reduced scale, of a bag for milk and the like after removal from the strip of FIG. 8.

An alternative construction of the bag of this invention may be produced in the manner shown in FIG. 8, in which a strip 10 of a suitable flexible plastic, such as polyethylene, may be heat sealed and partially severed at spaced positions along the strip, so that a series of bags, such as bag B' of FIG. 9, may be separated from the strip as desired. As before, each heat seal attaches the front and rear walls of the strip together, but may include a transverse heat seal section 45 which may be wider along a portion 46 adjacent one edge and be integral with a relatively wide, generally U-shaped heat seal section, formed by downwardly extending legs 47 and 48 connected together at their lower ends by a transverse heat seal section 49. As before, a transversely extending series of cuts or perforations 16' cross the wider portion 46 of heat seal section 45 but are spaced from the narrower portion of section 45, so that when the strip is separated along the successive lines of cuts or perforations 16', a series of bags, such as bag B' of FIG. 9, will be produced. The lower end of each bag B' is sealed by the transverse heat seal section 45 and the upper end is sealed by legs 47 and 48 and transverse section 49, as well as the remainder of the wider portion 46 of the next successive section 45. As will be evident, the space between leg 47 and the adjacent edge of the bag is adapted to form a pouring spout 21', which remains sealed by the wider portion 46 of section 45 until it is cut off, such as along dash line 22' of FIG. 9. Also, the unsealed portion between leg 48 and the opposite edge of the bag provides a filling portion 17', the upper end of which may be provided with a pair of spaced cuts 18', to facilitate separating the edges of the filling portion. Also, as before, a J-shaped cut 20' may extend downwardly within leg 47 and laterally into the transverse section 49, the J-shaped cut 20', as well as the J-shaped cut 20 of FIGS. 1 and 2 of bag B, preventing the cut 20 or 20' from extending downwardly into the bag, in the event that pouring spout 21 or 21' is pulled laterally.

Figure 10:
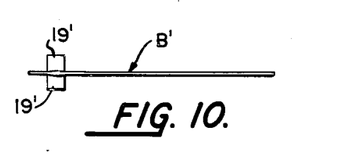
FIG. 10 is a top plan view of the bag of FIG. 9.

When bag B' is separated from strip 10, the tabs 19' between cuts 18' are preferably pulled apart, such as to the position of FIG. 10, so that the filling portion 17' may be more readily opened for filling purposes. When the cuts 18' are spaced apart a suitable distance, such as one-half to one inch, the tabs 19' may be initially separated by grasping them between the thumb and forefinger of one hand to slide them apart then an edge of each may be grasped to pull the tabs 19' outwardly. When the bag is to be filled, the outwardly extending tabs may be grasped and the unsealed filling portion pulled open, while the bag B of FIG. 2 may be similarly treated. When the strip 10 is produced and flattened, then rolled, the front and rear walls of the strip are pressed closely together and all air is usually expressed from the strip, so that the front and rear walls tend to adhere together and are difficult to separate along a cut line, even though unsealed. Thus, the cuts or slots 18 of FIGS. 1 and 2 and 18' of FIGS. 8 and 9 contribute materially to the facility with which the bags may be used.

To provide greater flexibility in use of the filling portion 17', a cut 50 may be produced to extend downwardly along leg 48 from cut or perforation line 16', cut 50 being preferably approximately J-shaped, i.e., extending at the lower end transversely into the transverse heat seal section 49, to prevent a lateral pull on the filling portion 17' from extending cut 50 downwardly into the bag. As before, after filling, the filling portion 17' may be closed, as by a heat seal between the dotted lines 26' of FIG. 9, or in any other suitable manner, as by a clip or clamp.

The flattened tubular strip 10 may be formed in a conventional manner, from a suitable plastic such as polyethylene, as by extruding the tube, in circular form, then flattening the tube after it has cooled sufficiently to prevent adherence of one side to the other and rolling up the flattened strip. Such a roll, such as roll 55 of FIG. 11, may be mounted on a shaft 56 so that it may be fed between a pair of heat sealing dies 57 and 58, then a pair of cutting dies 59 and 60 and thence onto a roll 61, mounted on a shaft 62. As will be evident, for producing the strip of FIG. 1 and bags B therefrom, the position of the cutting dies 59 and 60 should be adjusted, relative to the sealing dies 57 and 58, so that the series of cuts 16 and the longitudinal cuts 18 and 20 of FIG. 1 will be produced at the correct positions. Also, the progress of strip 10 between the sealing and cutting dies should be stepwise and the sealing and cutting dies separated during movement of the strip, so that during pauses between each step of the movement, the heat seal sections and the cuts may be produced. Since the diameter of roll 61 will vary, in accordance with the amount of strip 10 thereon, it will normally be found desirable to use separate means for pulling strip 10 between the sealing and cutting dies, such as a pair of feed rolls 63, driven by shafts 64 and synchronized with the desired stepwise movement of the strip. It will be understood, of course, that the movement of the sealing and cutting dies toward and away from each other should be synchronized with the movement of feed rolls 63.

Figure 11:
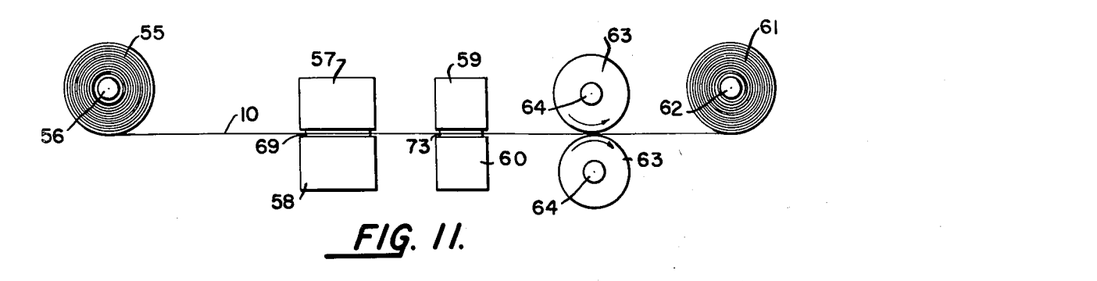
FIG. 11 is a partly diagrammatic side elevation of apparatus adapted to produce a series of bags in strip form, as in FIG. 1.
Figure 12:
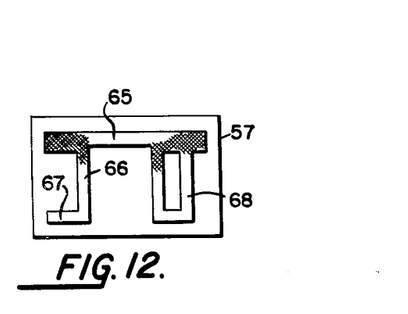
FIG. 12 is a bottom plan view, on an enlarged scale, of a heat sealing die forming a part of the apparatus of FIG. 11.
Figure 13:
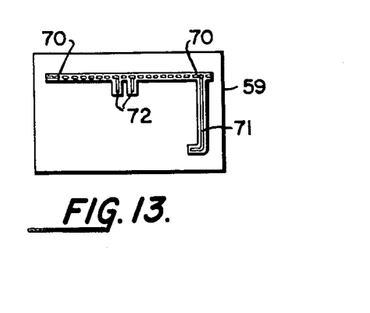
FIG. 13 is a bottom plan view, on an enlarged scale, of a cutting die forming a part of the apparatus of FIG. 11.

For producing bags B, the upper heating die 57 may, as in FIG. 12, be provided with a downwardly extending heating block formed of suitable heat conductive material, such as copper, and provided with heating elements therein, such block including a transversee section 65 corresponding to the heat seal section 11 of FIG. 1 and connected thereto a leg 66 and a lateral section 67 corresponding to the heat seal sections 13 and 14 of FIG. 1, as well as a generally U-shaped section 68, corresponding ot the heat seal section 15 of FIG. 1. The upper surface of lower heating die 58 may be flat, but preferably is provided with a raised block 69 of FIG. 11, similar in contour to the depending block of FIG. 12, while the block 69 on die 58 may be provided with heating elements or be unheated, as desired. The upper cutting die 59, as in FIG. 13, may be provided with a transverse series of depending cutting blades 70, adapted to produce the cuts or perforations 16 of FIG. 1, a J-shaped depending cutting blade 71, adapted to produce the cuts 20 of FIG. 1, as well as a pair of short blades 72 adapted to produce the cuts 18 of FIG. 1, it being noted that the blades 71 and 72 are mounted in perpendicular relation to the transverse line of the blade 70. The top of lower cutting die 60 may be flat, but is preferably provided with a backing block 73 having shearing edges with a contour corresponding to that of blades 70, 71 and 72 of FIG. 13, although cutting blades cooperating with blades 70, 71 and 72 may be provided on die 60, if desired. In the event that the raised block 69 of the lower sealing die 58 is unheated, it will be necessary only to raise the upper sealing die 57 during intermittent movement of the strip. Similarly, if the lower cutting die 60 is merely provided with backing blocks, or blocks having shearing edges rather than cutting blades, it is necessary only to move the upper cutting die 59 upwardly during intermittent movement of the strip.

Figure 14:
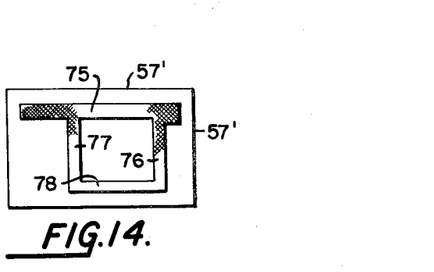
FIG. 14 is a bottom plan view, on an enlarged scale, of a heat sealing die which may be used in the apparatus of FIG. 11 in producing the strip of FIG. 8.
Figure 15:
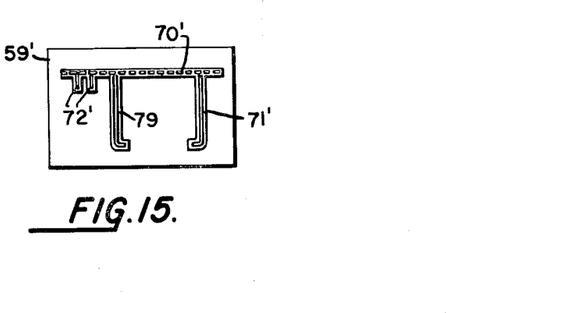
FIG. 15 is a bottom plan view, on an enlarged scale, of a cutting die which may be used in the apparatus of FIG. 11 in producing the strip of FIG. 8.

For producing the strip of FIG. 8, adapted to provide a series of bags B' of FIG. 9, the heating die 57' of FIG. 14 may be substituted for the heating die 57 of FIG. 11, while cutting die 59' of FIG. 15 may be substituted for the cutting die 59 of FIG. 11. Heating die 57' may be provided with a downwardly extending heating block formed of suitable heat conductive material, such as copper, and provided with heating elements therein, such block including a transversee section 75 corresponding to the heat seal section 45 of FIG. 8 and connected thereto spaced legs 76 and 77 and a transverse section 78, corresponding to legs 47 and 48 and transverse heat seal section 49, respectively, of FIG. 8. Block 69 of lower heating die 58 may have a similar configuration. The upper cutting die 59' of FIG. 15 may be provided with a transverse series of depending cutting blades 75, adapted to produce the cuts or perforations 16' of FIG. 8, as well as a J-shaped depending cutting blade 71', adapted to produce the J-shaped cut 20' of FIG. 8, a pair of short blades 72', adapted to produce cuts 18' of FIG. 8, and a J-shaped cutting blade 79, disposed in reverse position to blade 71' and adapted to produce the cut 50 of FIG. 8. As before, the raised block 73 of lower cutting die 60 may be provided with shearing edges having a contour corresponding to that of the blades 70', 71', 72' and 79, or cutting blades cooperating with the latter.

If desired, the sealing blocks and cutting blades described above may be mounted on rolls, conveniently with two or more heating blocks and two or more sets of cutting blades on the respective rolls, spaced circumferentially so that the heat sealed sections and cuts will be made at appropriate places to correspond with the length of bags B or B' ultimately desired, in which case the strip may be fed continuously through the heating and cutting dies.

Figure 16:
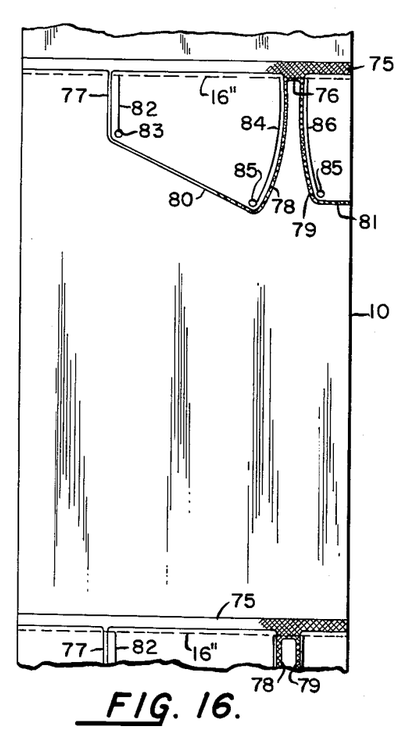
FIG. 16 is a plan view similar to FIG. 1, on a reduced scale, illustrating the manner in which a series of further alternative bags of this invention may be produced.
Figure 17:
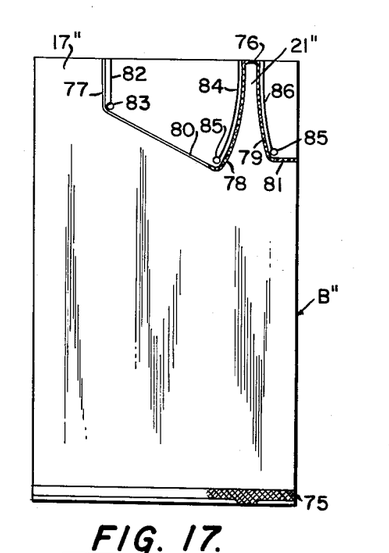
FIG. 17 is a side elevation, on a slightly reduced scale, of a bag after removal from the strip of FIG. 16.

A further alternative construction of the bag of this invention may be produced in the manner shown in FIG. 16, in which a strip 10 of a suitable flexible plastic, such as polyethylene, may be heat sealed and partially severed in spaced positions along the strip, so that a series of bags, such as bag B'' of FIG. 17, may be separated from the strip when desired. As before, each heat seal attaches the front and rear walls of the strip together and may include a transverse heat seal or heat seal section 75, which may be wider along a portion 76 spaced from one edge of the strip and also may be integral with a longitudinal heat seal or heat seal section 77, spaced from the opposite edge of the strip. A pair of heat seal sections 78 and 79 extend downwardly and flare outwardly from the opposite edges of the wider portion 76, while the ends of the heat seal sections 77 and 78 may be joined by a diagonal heat seal section 80 and the end of heat seal section 79 may be connected to the adjacent edge of the bag by a short, transverse heat seal section 81. As before, a transversely extending series of cuts or perforations 16'' may be spaced slightly from the heat seal section 75, so as to cross the wider section 76 thereof and also the longitudinal heat seal section 77, so that when the strip is separated along the line of the cuts or perforations 16'', a series of bags, such as bag B'' of FIG. 17, will be produced. A slot 82 may extend from perforations 16'' within the heat seal section 77, but is more conveniently spaced slightly therefrom, on the side opposite the adjacent edge of the strip, and terminate in a hole 83 adjacent the point of juncture between the heat seal sections 77 and 80. A slot 84 may extend from the series of perforations 16'' in spaced relation to and alongside the heat seal section 78 to a hole 85 adjacent the point of juncture between the heat seal sections 78 and 80, while a slot 86 may similarly extend in spaced relation alongside the heat seal section 79 to a hole 85 adjacent the point of juncture between the heat seal sections 79 and 81. As will be evident, when a bag B″ of FIG. 17 is separated from the strip of FIG. 16, the lower end of the bag is sealed by the transverse heat seal section 75, while the upper end of the bag, except for the portion 17″ between heat seal section 77 and the adjacent edge, is sealed by the heat seal sections 77, 80, 78, 76, 79, and 81. As before, the portion 17″ may be used as a filling portion, which may also be provided with a pair of relatively short, spaced slots, providing a tab therebetween for easier separation of the edges of the filling portion 17″, as in the embodiments previously described. As will also be evident, the portion of the bag between the heat sections 78 and 79 form a pouring spout 21″, which may be opened by cutting off the end of the pouring spout below the heat seal section 76. The slot 82 permits the filling spout to be folded over and sealed by a clip or other suitable device, while hole 83 prevents slot 82 from extending further into the bag, particularly across the heat seal 80, and the holes 85 prevent the respective slots 84 and 86 from extending farther into the bag, such as across the heat seal sections 80 and 81, respectively. The slots 84 and 86 separate the pouring spout 21″ from the remainder of the upper portion of the bag, such as to facilitate inserting the pouring spout within a control valve, when the bag is to be used for dispensing purposes. As will be evident, the pouring spout 21″ of bag B″ is located intermediate the edges of the bag and thus is less likely to be damaged when the bag is placed in a carton, for instance. In the bag of FIG. 17, the heat seal 78 is preferably longer than the heat seal 79, so that when the bag is inverted for discharge of the contents through the pouring spout 21″, the pressure of fluid tending to separate the walls will act against the wall portions adjacent the former lower end of heat seal 78 and cause them to spread, in a direction perpendicular to the plane of the drawing, thus spreading the walls of the spout 21″ above the then upper end of heat seal 79, and counteracting any tendency for the distention of the walls to close the pouring spout across its entrance.

Figure 18:
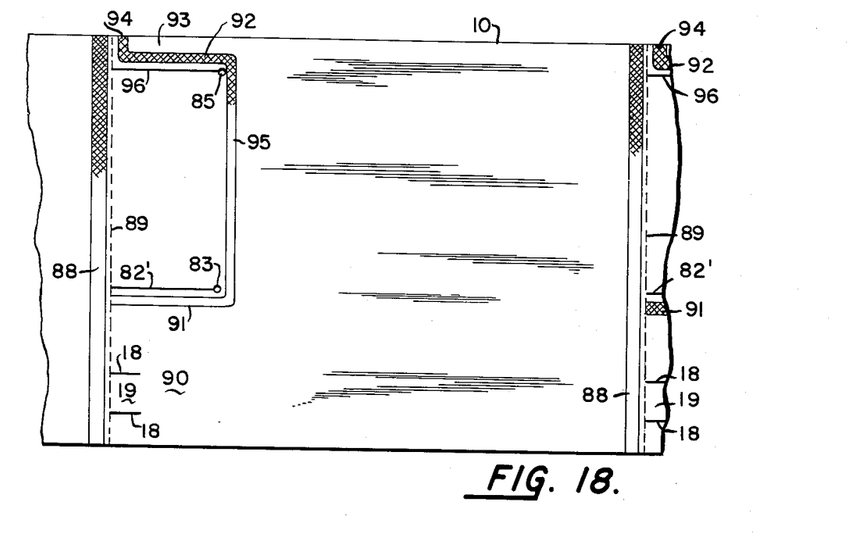
FIG. 18 is a plan view similar to FIG. 1, but on a reduced scale, illustrating the manner in which a series of further alternative bags of this invention may be produced.

A further alternative construction of the bag of this invention may be produced in the manner shown in FIG. 18, in which a strip 10 of a suitable flexible plastic, as before, may be heat sealed and partially severed in spaced positions along the strip, so that a series of bags may be separated from the strip where desired. As before, each heat seal attaches the front and rear walls of the strip together and may include a transverse heat seal 88, adjacent one edge of which a series of transversely extending series of cuts or perforations 89 may be produced, at successive positions along the strip, corresponding to the length of a bag, so that when a bag is separated from the strip, the transverse heat seal 88 will close the bottom of the bag. In addition, a connected series of heat seal sections may be produced, so as to close the top of the bag, when separated from the strip, except along a filling portion 90 adjacent one edge of the bag and in which a pair of relatively short slots 18 may be produced, so as to provide a tab 19 therebetween, to facilitate separation of the edges of the filling portion 90. Such additional connected heat seals may include a longitudinal heat seal 91 forming the opposite edge of the filling portion 90 and a longitudinal heat seal section 92, which is spaced from the opposite edge of the bag and adapted to form the inner boundary of a bag portion 93 adapted to form a pouring spout, the end of which may normally be closed by a transverse heat seal section 94 which extends in spaced relation to the perforations 89 to the adjacent edge of the strip, from one end of the heat seal section 92. The opposite end of the heat seal section 92 and the corresponding end of the heat seal section 91 may be connected by a transverse heat seal section 92, while a slot 82′ may extend from the perforations 89 and alongside the heat seal section 91, terminating in a hole 83, to permit the filling portion 90 to be separated from the remainder of the top of the bag and thereby to permit the filling portion to be folded over and sealed, as by a clip or other suitable device, after the bag has been filled to a desired extent. Also, a slot 96 may extend from the perforations 89 and alongside heat seal 92, on the side opposite the adjacent edge and terminating in a hole 85, to separate the pouring spout from the remainder of the upper portion of the bag. Conveniently, heat seal section 91 extends to a point at or adjacent the line of perforations 89, while the transverse heat seal section 94 may be spaced from the perforations 89, as shown, or may extend thereto or even may be integral with the transverse heat seal section 88, with which heat seal section 91 may also be integral. As will be evident from FIG. 18, when the strip is severed along the transverse series of perforations 89, individual bags will be produced having the heat seals and slots shown between the two series of perforations 89 shown in FIG. 18.

It will be evident that, by appropriate changes in the heating dies shown in FIG. 12 or 14 and the cutting dies shown in FIG. 15 or 16, the embodiments of FIGS. 16 and 17, as well as the embodiment of FIG. 18, may be readily produced in a manner similar to that previously described. As will be evident, the configuration of the heating blocks of FIG. 12 or 14 may be changed to produce the heat seal areas of these additional embodiments, while the configuration of the cutting blades of FIG. 15 or 16 may be changed to produce the transversely extending series of cuts or perforations of the various additional embodiments, as well as the slots shown therein. For cutting the holes 83 and 85 of FIG. 16, conventional punches may be associated with the cutting blades. As will be also evident, the bags of this invention may be produced individually instead of in strip form, while the various forms of this invention may be produced in strip form by the apparatus disclosed and claimed in the copending application of Lamont Slagel and Harry A. Mead, Serial No. 810,470, filed May 1, 1959, entitled "Apparatus for Making Bags." While the term heat seal is used herein to refer to the attachment of the front and rear walls of a strip or bag, it will be understood that the term includes a heat weld, in which the material of the two walls of the strip itself are fused, as well as a connection formed by heating a layer of perhaps different material to form a connection.

From the foregoing, it will be evident that this invention fulfills to a marked degree the requirements and objects hereinbefore set forth. A bag constructed in accordance with this invention is readily filled and emptied and may be made of sufficiently inexpensive material that it may be discarded after one use, thus avoiding the transportation difficulties and inconvenience of sterilization inherent in metal containers. The bag is also readily and relatively inexpensively manufactured, since the flattened tubular strip material may be readily purchased at a reasonable cost, while the heat sealing and cutting to form the bags may be performed on a production basis, as in the manner described, thus further reducing the cost thereof. By making a plurality of bags from a single strip and leaving the bags attached together, a roll of bags is produced which may not only be handled readily, but also may be more readily protected from contamination. By providing serrations, perforations or spaced cuts along a line which extends across the heat sealed area or between the two heat sealed areas, and also across an unsealed portion of the strip, a filling portion may be easily provided and may be disposed at one edge of the bag or between the edges of the bag. Also, by making cuts in the upper end of the filling portion, the difficulties normally inherent in opening plastic bags may be overcome. The filling portion, after the bag is filled, may also be readily closed. By producing suitable heat sealed areas at appropriate positions, such as described, a pouring spout may be provided, the end of which will remain sealed until the contents of the bag are to be discharged.

The pouring spout, as well as the filling portion, when at one edge of the bag, may be separated from the remainder of the upper or lower portion of the bag by a longitudinal cut, which may be J-shaped, or terminate in a hole, so that a lateral pull on either the pouring spout or filling portion will not tend to cause the cut to continue into the remainder of the bag.

Although certain preferred embodiments of this invention have been illustrated and described, as well as a preferred method of making the same, it will be understood that other embodiments may exist and various changes may be made therein, all without departing from the spirit and scope of this invention.

What is claimed is:

1. A bag for milk and the like, comprising front and rear walls formed of a heat sealable plastic material and connected together at their imperforate side edges; a heat seal connecting said walls together across the bottom of said bag; a first transverse heat seal extending inwardly from one edge of said bag at the top thereof; a longitudinal heat seal extending from said first transverse heat seal and downwardly in spaced relation to said edge; a heat seal extending laterally from the lower end of said downwardly extending, longitudinal heat seal to said edge; a second transverse heat seal extending from the opposite edge of said bag to a point spaced from said first transverse heat seal, the unsealed portion of the top of said bag between said first and second transverse heat seals providing a filling portion; a pair of slots in spaced relation extending downwardly in said unsealed portion from the top of said bag to form tabs to facilitate separating the walls of said unsealed portion; a generally U-shaped heat seal extending downwardly from said second transverse heat seal and in spaced relation to said opposite edge; and a slot extending downwardly from the top of said bag and within the portion of said U-shaped heat seal adjacent said opposite edge, the lower end of said slot extending laterally and away from said opposite edge and into the lower portion of said U-shaped heat seal, so as to separate the portion of the upper end of said bag between said slot and said adjacent edge, whereby the upper end of said separated portion may be severed below said second transverse heat seal to provide a spout for discharging the contents of said bag.

2. A bag for milk and the like comprising front and rear walls formed of a heat sealable plastic material and connected together at their imperforate side edges; a heat seal connecting said walls together across the bottom of said bag; a first transverse heat seal extending inwardly from one edge of said bag at the top thereof; a longitudinal heat seal extending from said first transverse heat seal and downwardly therefrom in spaced relation to said edge; a second longitudinal heat seal extending in spaced relation to the opposite edge of said bag and downwardly from the top thereof; a heat seal extending laterally across a portion of said bag and connecting the lower end of said first and second longitudinal heat seals; a pair of slots extending downwardly in spaced relation from the top of said bag within the unsealed portion between said second longitudinal heat seal and said opposite edge; a slot extending downwardly from the top of said bag and within said first longitudinal heat seal, the lower end of said slot extending laterally and away from said first edge of said bag and into said lateral heat seal; and a slot extending downwardly from the top of said bag and within said second longitudinal heat seal, the lower end of said slot extending laterally and away from said opposite edge of said bag and into said lateral heat seal.

3. A series of bags for milk and the like, comprising a flattened tubular strip formed of heat sealable plastic material and adapted to be placed in roll form, with individual bags being adapted to be separated from said strip; a series of heat seals at spaced positions along said strip corresponding to the length of the bags, including a heat seal extending transversely across said strip and having a lesser width along a portion thereof and a heat seal extending longitudinally from a portion of said transverse heat seal of greater width and in spaced relation to one edge of said strip; a series of apertures extending transversely across said strip along a line crossing each wider portion of a transverse heat seal but spaced from the adjacent edge of the portion of said transverse heat seal of lesser width, said series of apertures permitting an individual bag to be separated from said strip along said line of apertures, but causing each bag to be retained with said strip until separation occurs; and a series of pairs of spaced slots, each pair extending longitudinally from one said series of apertures at a position opposite a portion of said transverse heat seal of lesser width.

4. A series of bags for milk and the like, comprising a flattened tubular strip formed of heat sealable plastic material and adapted to be placed in roll form with individual bags adapted to be separated from said strip; a series of connected heat seals in spaced position along said strip corresponding to the length of a bag, including a heat seal extending transversely across said strip and having a short portion of greater width spaced from one edge of said strip, a pair of heat seals extending longitudinally away from said transverse heat seal and from the respective ends of said short portion of greater width, said heat seals flaring outwardly and away from each other, a heat seal extending longitudinally and away from said transverse heat seal and spaced from the opposite edge of said strip a greater distance than the length of said short portion, a heat seal extending diagonally from the end of said longitudinal heat seal to the end of the near flaring heat seal, and a heat seal extending transversely from the end of the other flaring heat seal to the adjacent edge of said strip; a series of apertures extending transversely across said strip along a line crossing each wider portion of a transverse heat seal but spaced from the adjacent edge of the remainder of said transverse heat seal, said series of apertures permitting an individual bag to be separated from said strip along said line of apertures, but causing each bag to be retained with said strip until separation occurs; a first series of slots, each disposed in spaced relation to a longitudinal heat seal but inwardly therefrom and extending from said series of apertures to a generally round hole adjacent the juncture between said longitudinal and diagonal heat seals; a second series of slots adjacent said flaring heat seals closest to said opposite edge of said strip, each of said second slots extending alongside said flaring heat seal from said line of apertures and terminating in a generally round hole adjacent the juncture between said flaring heat seal and said transverse heat seal; and a third series of slots adjacent the opposite flaring heat seals, on the side opposite said opposite edge, extending from said apertures to a generally round hole adjacent the point of juncture between said flaring heat seal and said diagonal heat seal.

5. A series of bags for milk and the like, comprising a flattened tubular strip formed of heat sealable, plastic material and adapted to be placed in roll form, with individual bags being adapted to be separated from said strip; a series of heat seals extending transversely across said strip in spaced positions along said strip corresponding to the length of a bag; a series of apertures extending across said strip on the same side of each of said transverse heat seals; a series of heat seals on the opposite side of said apertures from said transverse heat seals, each of said last mentioned heat seals including a longitudinally extending heat seal extending from said series of apertures and away from said transverse heat seal, in spaced relation to one edge of said strip, then as an intermediate heat seal transversely across said strip to a point adjacent the opposite edge, then generally parallel and in spaced relation to said opposite edge and toward said transverse heat seal and apertures, then transversely outwardly to said opposite edge; a series of pairs of slots extending longitudinally from said series of apertures in a direction away from said transverse heat seal substantially to said intermediate transversely extending heat seal and spaced inwardly from each of said longitudinal heat seals; and a second series of slots extending from said series of apertures in a direction away from said transverse heat seal and disposed in generally closely spaced relation, in the area between said one edge of said strip and said first mentioned longitudinal heat seal, each of said second pair of slots being adapted to form a tab therebetween to permit separation of the unsealed portion of the upper edge of a bag after separation from said strip.

6. A bag for milk and the like, comprising front and rear walls attached together at the side and bottom edges and formed of a flexible heat sealable plastic material, said walls along at least one of said edges being attached together by a heat seal; a relatively wide, open filling spout formed by an unsealed portion of the top of said bag, a first generally longitudinal heat seal extending to the top of said bag at one side of said unsealed portion and first generally longitudinally extending means joining said front and rear walls of said bag and extending to the top of said bag at the opposite side of said unsealed portion; a relatively narrow, closed pouring spout disposed laterally from said filling spout and formed by a heat seal extending across a limited top portion of said bag, a second generally longitudinal heat seal extending to one side of said limited heat seal and second generally longitudinally extending means joining said front and rear walls of said bag and extending to the opposite side of said limited heat seal; a heat seal extending generally across said bag and connecting said first and second generally longitudinal heat seals at positions spaced from the top of said bag; and means including a slit extending generally downwardly from the top of said bag and substantially coinciding with said second generally longitudinal heat seal and separating said pouring spout from the adjacent portion of said bag, said pouring spout being closed during filling and the upper end thereof being adapted to be severed below said limited heat seal to open said end.

7. A bag for milk and the like as defined in claim 6, wherein said first joining means comprises one side edge of said bag.

8. A bag for milk and the like as defined in claim 6, wherein said second joining means comprises one side edge of said bag.

9. A bag for milk and the like as defined in claim 6, wherein said second joining means comprises a third generally longitudinal heat seal at the opposite side of said filling spout and disposed at a position spaced from the adjacent edge of said bag, and a generally transverse heat seal extending from the lower end of said third generally longitudinal heat seal to said adjacent edge of said bag; and said separating means comprises a generally downwardly extending slit at each side of said pouring spout.

10. A bag for milk and the like, as defined in claim 9, wherein said second and third generally longitudinal heat seals diverge from each other in a downward direction.

References Cited in the file of this patent

UNITED STATES PATENTS

| 2,708,067 | Paton | May 10, 1955 |
| 2,800,269 | Smith | July 23, 1957 |
| 2,866,488 | Thompson | Dec. 30, 1958 |
| 2,935,241 | Brady | May 3, 1960 |

FOREIGN PATENTS

| 690,614 | Great Britain | Apr. 22, 1953 |
| 730,235 | Great Britain | May 18, 1955 |
| 1,128,387 | France | Aug. 20, 1956 |
| 1,154,361 | France | Oct. 28, 1957 |